US012575571B2

(12) United States Patent
Falco et al.

(10) Patent No.: US 12,575,571 B2
(45) Date of Patent: Mar. 17, 2026

(54) 1-AMINO-1-CYCLOPROPANECARBOXYLIC ACID AND METHYL JASMONATE MIXTURES AND USES THEREOF

(71) Applicant: Valent BioSciences LLC, Libertyville, IL (US)

(72) Inventors: Kimberly Ann Falco, Crystal Lake, IL (US); Steve McArtney, Antioch, IL (US); Peter D. Petracek, Grayslake, IL (US); Franklin Paul Silverman, Highland Park, IL (US); Marci Ann Surpin, Highland Park, IL (US); Derek D. Woolard, Zion, IL (US)

(73) Assignee: VALENT BIOSCIENCES LLC, Libertyville, IL (US)

( * ) Notice: Subject to any disclaimer, the term of this patent is extended or adjusted under 35 U.S.C. 154(b) by 280 days.

(21) Appl. No.: 18/479,417

(22) Filed: Oct. 2, 2023

(65) Prior Publication Data

US 2024/0108010 A1     Apr. 4, 2024

Related U.S. Application Data

(60) Provisional application No. 63/412,751, filed on Oct. 3, 2022.

(51) Int. Cl.

| | |
|---|---|
| *A01N 53/00* | (2006.01) |
| *A01N 37/42* | (2006.01) |
| *A01P 21/00* | (2006.01) |
| *A23B 2/758* | (2025.01) |
| *A23B 2/762* | (2025.01) |
| *A23B 7/154* | (2006.01) |

(52) U.S. Cl.
CPC ............. *A01N 53/00* (2013.01); *A01N 37/42* (2013.01); *A01P 21/00* (2021.08); *A23B 2/758* (2025.01); *A23B 2/762* (2025.01); *A23B 7/154* (2013.01)

(58) Field of Classification Search
CPC ......... A01N 53/00; A01N 37/42; A01P 21/00; A23B 2/758; A23B 2/762; A23B 7/154
See application file for complete search history.

(56) References Cited

U.S. PATENT DOCUMENTS

| | | |
|---|---|---|
| 2013/0303377 A1 | 11/2013 | Quaghebeur |
| 2021/0400978 A1 | 12/2021 | Surpin et al. |

OTHER PUBLICATIONS

Cabre et al., Identification and characterization of a new soybean promoter induced by Phakopsora pachyrrhizi, the casual agent of Asian soybean rust, BMC Biotechnology, 2021, 21:27.

Kondo et al., Effects of auxin and jasmonates on 1-aminocyclopropane-1-carboxylate (ACC) synthase and ACC oxidase gene expression during ripening of ACC apple fruit, Postharvest Biology and Technology, Feb. 2009, 51(2), 281-284.

International Search Report and Written Opinion mailed Feb. 2, 2024 in corresponding PCT Application PCT/US23/34266.

*Primary Examiner* — Trevor Love

(74) *Attorney, Agent, or Firm* — Wood, Phillips, Katz, Clark & Mortimer

(57) ABSTRACT

The present invention is directed to an agricultural mixture comprising 1-amino-1-cyclopropanecarboxylic acid, a hydrate thereof, a polymorph thereof or a salt thereof and methyl jasmonate. The present invention is further directed to a method of enhancing apple coloration comprising applying a mixture of the present invention to apples.

8 Claims, No Drawings

1-AMINO-1-CYCLOPROPANECARBOXYLIC ACID AND METHYL JASMONATE MIXTURES AND USES THEREOF

FIELD OF THE INVENTION

The present invention is directed to an agricultural mixture comprising 1-amino-1-cyclopropanecarboxylic acid, a hydrate thereof, a polymorph thereof or a salt thereof and methyl jasmonate. The present invention is further directed to a method of enhancing apple coloration comprising applying a mixture of the present invention to apples.

BACKGROUND OF THE INVENTION 1-amino-1-cyclopropanecarboxylic acid ("ACC") is synthesized by ACC synthase in plants and acts as a precursor for the biosynthesis of ethylene. Ethylene has been shown to be involved in several plant responses including stress, fruit set, leaf abscission and anthesis. Because of its role as an ethylene precursor ACC has been used in agriculture to induce ethylene responsive events.

Methyl jasmonate is a phytohormone derived from cyclic fatty acids and regulates plant defenses to pests and further regulates developmental processes. Methyl jasmonate has been well studied and has been further found to be involved in root growth, growth of reproductive organs and plant senescence.

Apple coloration is highly important to marketability and is associated with increased nutritional value. However, many growers struggle to achieve the 50-60% coloration required by retailers. This is especially true for particular varieties such as Gala. Thus, there is a need in the art for compositions capable of achieving enhanced apple coloration.

SUMMARY OF THE INVENTION

In one aspect, the present invention is directed to an agricultural mixture comprising 1-amino-1-cyclopropanecarboxylic acid ("ACC"), a hydrate thereof, a polymorph thereof or a salt thereof and methyl jasmonate.

In another aspect of the invention, the present invention is directed to methods of enhancing apple coloration comprising applying an effective amount of a mixture of ACC a hydrate thereof, a polymorph thereof or a salt thereof and methyl jasmonate to apples.

DETAILED DESCRIPTION OF THE INVENTION

Applicant has discovered that a mixture of 1-amino-1-cyclopropanecarboxylic acid ("ACC") and methyl jasmonate is unexpectedly superior at enhancing apple coloration as compared to application of either alone.

In one embodiment, the present invention is directed to an agricultural mixture comprising 1-amino-1-cyclopropanecarboxylic acid ("ACC") a hydrate thereof, a polymorph thereof or a salt thereof and methyl jasmonate.

ACC can be used in the form of salt derived from inorganic or organic acids or bases. Acid addition salts of the active ingredients of the present invention can be prepared in situ during the final isolation and purification of the compounds of the invention or separately by reacting a free base function with a suitable organic acid. Representative acid addition salts include, but are not limited to acetate, adipate, alginate, aspartate, benzoate, benzenesulfonate, bisulfate, butyrate, camphorate, camphorsulfonate, digluconate, glycerophosphate, hemisulfate, heptanoate, hexanoate, fumarate, hydrochloride, hydrobromide, hydroiodide, 2-hydroxyethansulfonate (isothionate), lactate, maleate, methanesulfonate, nicotinate, 2-naphthalenesulfonate, oxalate, palmitoate, pectinate, persulfate, 3-phenylpropionate, picrate, pivalate, propionate, succinate, tartrate, thiocyanate, phosphate, glutamate, bicarbonate, p-toluenesulfonate and undecanoate. Also, the basic nitrogen-containing groups can be quaternized with such agents as lower alkyl halides such as methyl, ethyl, propyl, and butyl chlorides, bromides and iodides; dialkyl sulfates like dimethyl, diethyl, dibutyl and diamyl sulfates; long chain halides such as decyl, lauryl, myristyl and stearyl chlorides, bromides and iodides; arylalkyl halides like benzyl and phenethyl bromides and others. Water or oil-soluble or dispersible products are thereby obtained. Examples of acids which can be employed to form acid addition salts include such inorganic acids as hydrochloric acid, hydrobromic acid, hyaluronic acid, and phosphoric acid and such organic acids as oxalic acid, maleic acid, methanosulfonic acid, and succinic acid. Basic addition salts can be prepared in situ during the final isolation and purification of compounds of this invention by reacting a carboxylic acid-containing moiety with a suitable base such as the hydroxide, carbonate or bicarbonate of a pharmaceutically acceptable metal cation or with ammonia or an organic primary, secondary or tertiary amine. Salts include, but are not limited to, cations based on alkali metals or alkaline earth metals such as lithium, sodium, potassium, calcium, magnesium and aluminum salts and the like and nontoxic quaternary ammonia and amine cations including ammonium, tetramethylammonium, tetraethylammonium, methylammonium, dimethylammonium, trimethylammonium, triethylammonium, diethylammonium, and ethylammonium among others. Other representative organic amines useful for the formation of base addition salts include ethylenediamine, ethanolamine, diethanolamine, piperidine, piperazine and the like.

Hydrates of ACC suitable for use in the present invention include ACC trihydrate and ACC anhydrate.

In a preferred embodiment, the concentration ratio of ACC, a hydrate thereof, a polymorph thereof or a salt thereof to methyl jasmonate is from about 1,000:1 to about 1:1,000, more preferably from about 100:1 to 1:100, even more preferably from about 10:1 to about 1:10, yet even more preferably from about 6:1 to about 1:6 and most preferably at about 6:1, 1:1 or 1:6.

The present invention is further directed to compositions comprising a mixture of ACC, a hydrate thereof, a polymorph thereof or a salt thereof and methyl jasmonate.

In a preferred embodiment, ACC is present in compositions of the present invention at a concentration from about 1 to about 1,000 parts per million ("ppm"), more preferably at a concentration from about 10 to about 500 ppm, even more preferably at a concentration from about 50 to about 300 ppm and most preferably at about 50 to about 300 ppm.

In a preferred embodiment, methyl jasmonate is present in compositions of the present invention at a concentration from about 1 to about 1,000 ppm, more preferably at a concentration from about 10 to about 500 ppm, even more preferably at a concentration from about 50 to about 300 ppm and most preferably at about 50 to about 300 ppm.

In a preferred embodiment, the compositions of the present invention may further comprise one or more excipients selected from the group consisting of solvents, anti-caking agents, stabilizers, defoamers, slip agents, humectants, dispersants, wetting agents, thickening agents, emulsifiers, penetrants, adjuvants, synergists, polymers, propellants and preservatives.

In another aspect of the invention, the present invention is directed to methods of enhancing apple coloration comprising applying an effective amount of a mixture of ACC a hydrate thereof, a polymorph thereof or a salt thereof and methyl jasmonate to apples.

In a preferred embodiment, ACC a hydrate thereof, a polymorph thereof or a salt thereof is applied at a rate from about 1 to about 1,000 grams per hectare ("g/HA"), more preferably from about 10 to about 500 g/HA, even more preferably from about 50 to about 300 g/HA and most preferably at about 50 or about 300 g/HA.

In another preferred embodiment, methyl jasmonate is applied at a rate from about 1 to about 1,000 grams per hectare ("g/HA"), more preferably from about 10 to about 500 g/HA, even more preferably from about 50 to about 300 g/HA and most preferably at about 50 or about 300 g/HA.

The mixtures of the present invention can be applied by any convenient means. Those skilled in the art are familiar with the modes of application that include foliar applications such as spraying, dusting, and granular applications; soil applications including spraying, in-furrow treatments, or side-dressing. In a preferred embodiment, the mixtures of the present invention are applied to the plant and/or its fruit as a spray and even more preferably as a foliar spray or space spray.

As used herein, all numerical values relating to amounts, weight percentages and the like are defined as "about" or "approximately" each particular value, namely, plus or minus 10%. For example, the phrase "about 5,000 parts per million" is to be understood as "from 4,500 to 5,500 parts per million." Therefore, amounts within 10% of the claimed values are encompassed by the scope of the claims.

As used herein, "composition" refers to one or more active ingredients in a carrier. The carrier may be a liquid, a semi-solid, a solid or a gas and may contain additional ingredients. For example, a fermentation broth is a suitable carrier for the present invention.

The term "effective amount" means the amount of the formulation that will control the target pest. The "effective amount" will vary depending on the mixture concentration, the type of pest(s) being treated, the severity of the pest infestation, the result desired, and the life stage of the pest during treatment, among other factors. Thus, it is not always possible to specify an exact "effective amount." However, an appropriate "effective amount" in any individual case may be determined by one of ordinary skill in the art.

Throughout the application, the singular forms "a," "an," and "the" include plural reference unless the context clearly dictates otherwise.

The invention is demonstrated by the following representative examples. These examples are offered by way of illustration only and not by way of limitation.

EXAMPLES

Example 1—Apple Coloration in Imperial Gala Variety

Method 10 sets of unripened apples, Imperial Gala variety, harvested three weeks before the normal harvest date, were each foliar sprayed with either 1) 0.05% Regulaid® as a control, 2) 50 ppm methyl jasmonate, 3) 300 ppm methyl jasmonate, 4) 50 ppm ACC, 5) 300 ppm ACC or 6) a mixture of 50 ppm methyl jasmonate and 50 ppm ACC or 7) a mixture of 300 ppm methyl jasmonate and 300 ppm ACC. 34 hours post spray application percent red pixel area (shaded) was measured. Percent red pixel area is an indication of the coloration of the apple fruit.

To determine if the mixture provided unexpected results, the observed combined efficacy ("OCE") was divided by the expected combined efficacy ("ECE") wherein the ECE is calculated by the Abbott method:

$$ECE = A + B - (AB/100),$$

wherein ECE is the expected combined efficacy and in which A and B are the fold change from control given by the single active ingredients. If the ratio between the OCE of the mixture and the ECE of the mixture is greater than 1, then greater than expected interactions are present in the mixture. (Gisi, Synergistic Interaction of Fungicides in Mixtures, The American Phytopathological Society, 86:11, 1273-1279, 1996). Results can be found in Table 1, below.

TABLE 1

| Treatment | Average % Red Pixel Area | Fold Change From control | OCE/ECE Ratio |
|---|---|---|---|
| 0.05% Regulaid ® (Control) | 6.80 | 1 | — |
| 50 ppm methyl jasmonate | 63.31 | 8.31 | — |
| 50 ppm ACC | 7.02 | 0.03 | — |
| 300 ppm methyl jasmonate | 47.60 | 6.00 | — |
| 300 ppm ACC | 4.66 | −0.31 | — |
| 50 ppm methyl jasmonate 50 ppm ACC | 26.27 | 2.86 | 0.41 |
| 300 ppm methyl jasmonate 300 ppm ACC | 46.61 | 5.86 | 1.02 |

Results

As demonstrated in Table 1, application of a mixture of methyl jasmonate and ACC resulted in a greater than additive effect on coloration of Imperial Gala apples. Specifically, application of the mixture resulted in an OCE/ECE ratio of 1.02 for average percent red pixel area as compared to control when each are applied at 300 ppm.

Example 2—Apple Coloration in Ultima Gala Variety

Method 10 sets of unripened apples, Ultima Gala variety, harvested three weeks before the normal harvest date, were each foliar sprayed with either 1) 0.05% Regulaid® as a control, 2) 50 ppm methyl jasmonate, 3) 300 ppm methyl jasmonate, 4) 50 ppm ACC, 5) 300 ppm ACC or 6) a mixture of 50 ppm methyl jasmonate and 50 ppm ACC or 7) a mixture of 300 ppm methyl jasmonate and 300 ppm ACC. 34 hours post spray application percent red pixel area (shaded) was measured. Percent red pixel area is an indication of the coloration of the apple fruit. Results can be found in Table 2, below.

TABLE 2

| Treatment | Average % Red Pixel Area | Fold Change From control | OCE/ECE Ratio |
|---|---|---|---|
| 0.05% Regulaid ® (Control) | 11.12 | 1 | — |
| 50 ppm methyl jasmonate | 36.64 | 2.30 | — |
| 50 ppm ACC | 10.44 | −0.06 | — |
| 300 ppm methyl jasmonate | 46.37 | 3.17 | — |
| 300 ppm ACC | 14.87 | 0.34 | — |
| 50 ppm methyl jasmonate 50 ppm ACC | 36.04 | 2.24 | 1.00 |
| 300 ppm methyl jasmonate 300 ppm ACC | 53.22 | 3.79 | 1.06 |

Results

As demonstrated in Table 1, application of a mixture of methyl jasmonate and ACC resulted in a greater than additive effect on coloration of Ultima Gala apples. Specifically, application of the mixture resulted in an OCE/ECE ratio of 1.06 for average percent red pixel area as compared to control when each are applied at 300 ppm.

What is claimed is:

1. A method of enhancing apple coloration comprising applying a mixture of about 300 ppm 1-amino-1-cyclopropanecarboxylic acid, and about 300 ppm methyl jasmonate to apples.

2. The method of claim 1, wherein 1-amino-1-cyclopropanecarboxylic acid is applied at a rate from about 1 to about 1,000 grams per hectare.

3. The method of claim 2, wherein 1-amino-1-cyclopropanecarboxylic acid is applied at a rate from about 10 to about 500 grams per hectare.

4. The method of claim 3, wherein 1-amino-1-cyclopropanecarboxylic acid is applied at a rate from about 50 to about 300 grams per hectare.

5. The method of claim 1, wherein methyl jasmonate is applied at a rate from about 1 to about 1,000 grams per hectare.

6. The method of claim 5, wherein methyl jasmonate is applied at a rate from about 10 to about 500 grams per hectare.

7. The method of claim 6, wherein methyl jasmonate is applied at a rate from about 50 to about 300 grams per hectare.

8. The method of claim 1, wherein the composition further comprises one or more excipients selected from the group consisting of solvents, anti-caking agents, stabilizers, defoamers, slip agents, humectants, dispersants, wetting agents, thickening agents, emulsifiers, penetrants, adjuvants, synergists, polymers, propellants and preservatives.

* * * * *